April 13, 1965   C. H. WORSHAM   3,178,315
ELECTROLYTE ADDITIVE
Filed March 1, 1962
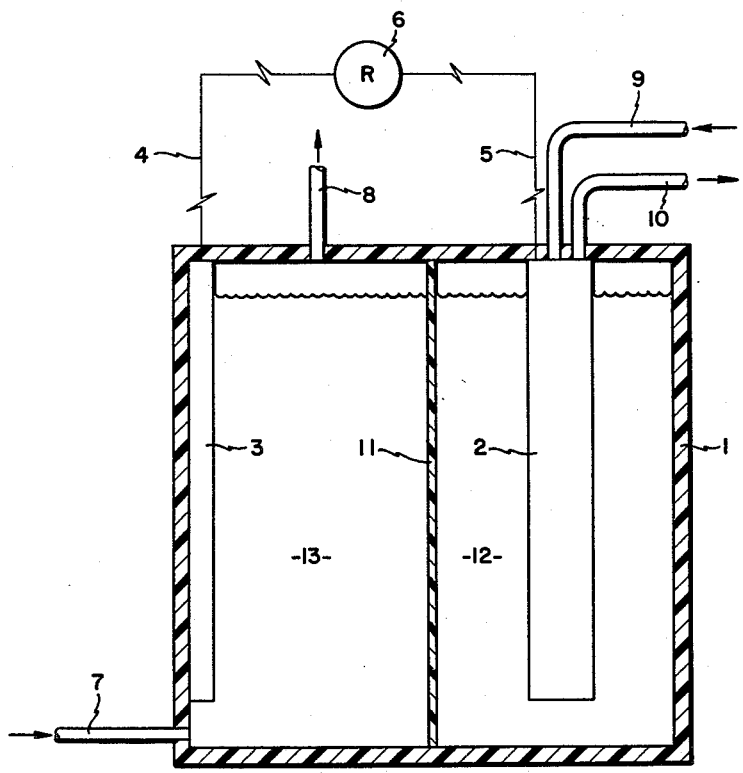
CHARLES H. WORSHAM   INVENTOR
BY *Olin B. Johnson*
PATENT ATTORNEY

United States Patent Office 3,178,315
Patented Apr. 13, 1965

3,178,315
ELECTROLYTE ADDITIVE
Charles H. Worsham, Fanwood, N.J., assignor to Esso Research and Engineering Company, a corporation of Delaware
Filed Mar. 1, 1962, Ser. No. 176,653
6 Claims. (Cl. 136—86)

This invention relates to electrochemical conversion of chemical energy to electrical energy. In particular, this invention relates to a novel fuel cell and to a novel process for the operation of a fuel cell employing an electrolyte soluble catalyst. More particularly, this invention relates to the use of certain rare earth metals of the lanthanide series in ionic form in fuel cell electrolytes.

The term "fuel cell" is used herein and in the art to denote a device, system or apparatus wherein chemical energy of a combustible fuel is electrochemically converted to electrical energy at a non-sacrificial or inert electrode. The true fuel cell is adapted for continuous operation and is supplied with both fuel and oxidant from sources outside the cell proper. Such cells include at least two non-sacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition or ion-exchange membrane.

Thus, in each such cell a fuel is oxidized at the anode and an oxidant is reduced at the cathode upon receiving electrons from such cathode. Fuel cells wherein the sole or primary fuel is oxidized upon direct contact with the anode without the intervention of a more easily oxidized intermediate reductant are known in the art as "direct fuel cells." This invention is concerned with improvements in direct fuel cells employing an organic fuel and a sulfuric acid comprising electrolyte.

Hydrogen, carbon monoxide, hydrocarbons and various substituted hydrocarbons have been suggested as possible sources of chemical energy for fuel cell oxidation. For instance, U.S. Patent 2,384,463, issued to R. Gunn et al., discloses gaseous fuels including hydrogen, carbon monoxide, methane, ethane, propane, butane, iso-butane, water gas, producer gas, illuminating gas, natural gas and liquid fuels including petroleum, the many derivatives and products thereof, the broad class of hydrocarbons and the oxygenated derivatives thereof such as the alcohols. In another example of the prior art, U.S. Patent 2,925,454, E. Justi et al. suggest the use in fuel cells of a liquid fuel which is a member of the group consisting of alcohols, ketones, ethers, paraffins, and aromatic hydrocarbons having not more than 14 carbon atoms per molecule.

This invention may be advantageously practiced with any organic compound suitable for use in conventional fuel cells employing an aqueous, acidic electrolyte. It is preferred, however, to employ olefins, particularly $C_2$–$C_6$ aliphatic olefins, as the organic fuel when such fuel is a hydrocarbon. When oxygenated hydrocarbons are to be used it is preferred to employ alcohols, particularly $C_1$–$C_5$ aliphatic alcohols. These may be either monohydric or polyhydric, e.g. methyl alcohol, ethylene glycol, etc.

When an organic fuel is employed as the primary fuel the efficiency of the fuel cell is enhanced by achieving an electrochemical reaction wherein the oxidation proceeds rapidly to completion yielding carbon dioxide and water with a release of electrons to the anode. Efficiency of operation for the generation of power is therefore enhanced by minimizing the formation of intermediate oxidation products which under the conditions of oxidation may prove to be more resistive to oxidation than is the original feedstock. Heretofore, in cells operating at relatively low temperatures, e.g. 70° to 400° F., efforts to increase the efficiency of the electrochemical oxidation have concentrated upon improvements in catalytic electrodes.

If a catalyst is to remain fixed in position upon an electrode surface it must be insoluble in the electrolyte, which it contacts. In cells employing a strong acid electrolyte, e.g. aqueous $H_2SO_4$, this has meant the use of noble metal catalysts.

It now has been discovered that the efficiency of a power generating fuel cell employing an aqueous acid electrolyte is surprisingly improved by the presence in such electrolyte of catalytic amounts of the elements cerium, europium, or ytterbium in ionic form. The advantages obtained by employing these ions in the anolyte are particularly applicable to the generation of electrical energy from an organic fuel and are manifest by increases in maximum current density and increased selectivity to carbon dioxide.

These ions may be added directly to the electrolyte in the form of a compound of the element that is soluble in the electrolyte or a separate solution of the compound may be prepared and the ion admitted to the electrolyte via either the fuel or oxidant inlet means depending upon the construction of the cell employed, the fuel, the electrolyte, etc.

In a preferred embodiment of this invention the electrolyte employed is aqueous sulfuric acid and the rare earth metal is added thereto in the form of its oxide. The rare earth metal ions are preferably employed in low concentrations, i.e. about 0.0001 to 1.0 or higher, preferably about 0.001 to 0.3, and more preferably about 0.001 to 0.03 gram atoms per liter or expressed in terms of the compound dissolved the equivalent number of moles per liter. With liquid fuels that dissolve freely in the electrolyte the lower portion of this range is preferred and the concentration is preferably maintained below about 0.5 gram atoms per liter.

Referring now to the accompanying drawing, which provides a schematic side view of a simple fuel cell wherein the advantages of this discovery can be demonstrated, one embodiment of the invention is discussed in greater detail.

Inside vessel 1 is positioned cathode 2 and anode 3 which are electrically connected by wires 4 and 5 and resistance means 6 which is symbolic of any appliance or device utilizing direct electric current for power. Fuel inlet conduit 7 provides means for admitting an electrolyte soluble fuel, e.g. an olefin or an oxygen substituted hydrocarbon of lower oxidation state than the carbon oxides. Conduit 7 may also be utilized for admitting a solution containing rare earth metal ions into the anolyte. Fuel exhaust conduit 8 is provided as means for releasing carbon dioxide formed in anodic oxidation of the organic fuel. Cathode 2 utilized for introducing the oxidant, e.g. air, oxygen gas, etc., to the cell is here shown in the form of a porous carbon cylinder. Oxidant inlet conduit 9 provides means of ingress for such oxidant to cathode 2 through which the oxygen diffuses to the electrolyte. Oxidant exhaust conduit 10 provides exhaust means for releasing excess oxidant and unused inert gases such as nitrogen when air is used. Anode 3, the fuel electrode, is here shown as a metal sheet but may comprise a porous structure as for example when a gaseous fuel is employed. The anode and cathode may be correspondingly plated or impregnated with conventional fuel cell catalysts which are resistant to chemical attack by the particular electrolyte employed, e.g. gold, noble metals of Group VIII of the Periodic Table or mixtures of the same. The electrolyte compartment formed by vessel 1 is divided by electrolyte partition 11 into a catholyte compartment 12 and an anolyte compartment 13. Partition 11 may take the form of an ion-exchange membrane or suitable ion-permeable structure where it is desirable to limit migration of fuel from the anolyte to the proximity of the cathode. In embodiments where contact of the fuel with the cathode does not significantly limit the efficiency of the cell because of fuel or catalyst choice the partition can be dispensed with altogether. Anolyte compartment 13 contains an aqueous acid electrolyte, e.g. sulfuric acid, phosphoric acid, etc. Catholyte compartment 12 also contains an aqueous acid which may be the same or different from that in compartment 13 and of the same or different concentration, e.g. phosphoric acid, sulfuric acid, mixtures of sulfuric acid and other acids, etc.

The invention will be more easily understood from the following examples which are for purposes of illustration only and should not be construed as limitations upon the true scope of the invention as set forth in the claims.

EXAMPLE I

In the anodic oxidation of methanol in a cell employing a sulfuric acid electrolyte and a platinum anode various electrolyte soluble compounds of rare earth metals were dissolved in the electrolyte and the effect of the metal ions released upon rate of reaction of the methanol was measured. In each study the electrolyte contained 0.5 mole $H_2SO_4$ per liter and 1 mole methanol per liter. The rare earth metal comprising compounds were in each test employed in a 0.001 molar concentration. The electrolyte temperature was 75° F. for each test. The anode employed was a platinum wire upon which platinum black had been electrodeposited. The results of these tests are set forth in the following table.

Table I.—Effect of rare earth metal ions on anodic oxidation of methanol

| Element [2] | Polarization Volts at Zero Current [1] | Amps./Ft.[2] @ Volts Polarization Indicated From Theoretical Fuel Electrode [1] | | | |
|---|---|---|---|---|---|
| | | 0.6 | 0.8 | 1.0 | 1.2 |
| None | 0.14 | 18 | 166 | 324 | 324 |
| Cerium | 0.13 | 20 | 174 | 332 | 425 |
| Europium | 0.13 | 18 | 192 | 388 | 527 |
| Ytterbium | 0.12 | 25 | 182 | 336 | 477 |

[1] The term "polarization" whenever employed in this specification refers to the difference between observed voltage and the voltage of a reversible electrode operating with the same reactant, temperature, pressure and electrolyte. It does not refer to the difference between observed voltage and open circuit voltage (rest potential).
[2] Added as oxides.

EXAMPLE II

The effect of adding rare earth metal ions to the anolyte of a cell employing 2-butanol as the organic fuel and sulfuric acid electrolyte was tested with europium. A 0.001 molar concentration of the simple oxide of this metal, $Eu_2O_3$, was added to an electrolyte solution containing 3.6 moles $H_2SO_4$ per liter and 7 moles 2-butanol per liter. The electrolyte temperature employed was 170° F. The anode employed was a platinum sheet upon which platinum black was deposited. The results obtained are set forth in the following table.

Table II.—Effect of certain rare earth metal ions on anodic oxidation of 2-butanol

| Oxide Added | Volts Polarization at Amps./Ft.[2] Indicated | | | |
|---|---|---|---|---|
| | 0.0 | 1 | 10 | 300 |
| None | 0.21 | 0.69 | 0.77 | 1.13 |
| Europium | 0.19 | 0.51 | 0.70 | 1.13 |

A higher concentration of ions is therefore indicated in high current density ranges with this particular fuel.

The effect of these rare earth metal ions upon selectivity to carbon dioxide was tested by measuring the carbon dioxide evolved and relating the figures obtained to the current drawn from the cell. The percentage of current developed due to carbon dioxide formation was increased fivefold upon the addition of 0.001 mole europium oxide per liter of electrolyte.

EXAMPLE III

A fuel cell is run employing a gaseous fuel, cis-butene-2, which is fed to the electrolyte through a porous anode. The oxidant at the cathode is changed employing oxygen gas in some tests and air in others while the concentration of sulfuric acid in the electrolyte is varied from 0.5 to 10 moles per liter. The effect of adding electrolyte soluble compounds of the aforementioned rare earth metals to the electrolyte is tested and the benefits obtained are found to extend to the use of a gaseous organic fuel as well as to the oxidation of a liquid fuel.

EXAMPLE IV

The procedures of Example III are repeated with the difference that each of the aforementioned rare earth metals is added first in the form of the corresponding sulfate and second in the form of the corresponding nitrate.

The term "combustible fuel" as employed herein is limited to hydrogen, carbon monoxide, and organic compounds containing at least one carbon atom and at least one hydrogen atom per molecule.

What is claimed is:

1. In a process for the anodic oxidation of an organic compound selected from the group consisting of a $C_1$–$C_5$ alcohol and a $C_2$–$C_6$ olefin in contact with an aqueous anolyte comprising 0.5 to 10 moles per liter of $H_2SO_4$, the improvement comprising the addition to said anolyte of a soluble salt selected from the group consisting of an oxide, a sulfate and a nitrate of a metal selected from the group consisting of cerium, europium and ytterbium.

2. In a method for operating a fuel cell for the generation of an electrical potential by the anodic oxidation of an organic fuel selected from the group consisting of a $C_1$–$C_5$ alcohol and a $C_2$–$C_6$ olefin in contact with an aqueous anolyte comprising 0.5 to 10 moles per liter of $H_2SO_4$, the improvement which comprises the addition of a catalytic amount of a soluble salt selected from the group consisting of an oxide, a sulfate and a nitrate of a metal selected from the group consisting of cerium, europium and ytterbium to said anolyte.

3. In a cell for the electrochemical oxidation of an organic compound selected from the group consisting of a $C_1$–$C_5$ alcohol and a $C_2$–$C_6$ olefin comprising an aqueous acid anolyte in contact with an anode, the improvement comprising an aqueous anolyte consisting essentially of 0.5 to 10 moles per liter of $H_2SO_4$, a catalytic amount of a soluble salt selected from the group consisting of an oxide, a sulfate and a nitrate of a metal selected from the group consisting of cerium, europium and ytterbium and water.

4. A process in accordance with claim 1 wherein said compound is europium oxide.

5. A process in accordance with claim 1 wherein said compound is cerium oxide.

6. A process in accordance with claim 1 wherein said compound is ytterbium oxide.

References Cited by the Examiner

UNITED STATES PATENTS

| | | | |
|---|---|---|---|
| 1,190,878 | 7/16 | Emanuel | 136—86 |
| 2,615,932 | 10/52 | Marko | 136—122 |
| 2,901,522 | 8/59 | Bopp | 136—86 |
| 2,901,524 | 8/59 | Gorin et al. | 136—86 |
| 2,913,511 | 11/59 | Grubb | 136—86 |
| 3,013,098 | 12/61 | Hunger | 136—86 |

FOREIGN PATENTS

| | | |
|---|---|---|
| 18,477 | 10/92 | Great Britain. |
| 877,410 | 9/61 | Great Britain. |

JOHN H. MACK, *Primary Examiner.*

JOHN R. SPECK, *Examiner.*